(12) United States Patent
Amaya et al.

(10) Patent No.: US 9,815,120 B2
(45) Date of Patent: Nov. 14, 2017

(54) CUTTING METHOD FOR INNER CIRCUMFERENTIAL FACE OR OUTER CIRCUMFERENTIAL FACE OF WORK

(71) Applicant: Matsuura Machinery Corporation, Fukui, Fukui (JP)

(72) Inventors: Kouichi Amaya, Fukui (JP); Toshihiko Kato, Fukui (JP); Yasunori Takezawa, Fukui (JP); Tetsuya Igarashi, Fukui (JP); Shuichi Ohashi, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 15/412,699

(22) Filed: Jan. 23, 2017

(65) Prior Publication Data

US 2017/0129017 A1 May 11, 2017

Related U.S. Application Data

(63) Continuation-in-part of application No. 15/069,156, filed on Mar. 14, 2016.

(30) Foreign Application Priority Data

Oct. 2, 2015 (JP) ................................ 2015-197065
Apr. 13, 2016 (JP) ................................ 2016-079952

(51) Int. Cl.
  *B23B 3/26* (2006.01)
  *B23B 5/36* (2006.01)
  (Continued)

(52) U.S. Cl.
  CPC .................. *B23B 3/26* (2013.01); *B23B 5/38* (2013.01); *B23B 5/36* (2013.01); *B23B 5/40* (2013.01); *B23B 2220/52* (2013.01)

(58) Field of Classification Search
  CPC .... B23B 3/26; B23B 3/22; B23B 5/40; B23B 5/36; B23B 2220/52; Y10T 82/128; Y10T 82/125; Y10T 82/12; Y10T 82/148
  See application file for complete search history.

(56) References Cited

U.S. PATENT DOCUMENTS

| | | | |
|---|---|---|---|
| 3,710,659 A | 1/1973 | Pagella et al. | |
| 4,592,684 A * | 6/1986 | Baker | B23Q 1/54 409/132 |

(Continued)

FOREIGN PATENT DOCUMENTS

| | | |
|---|---|---|
| JP | 49-28704 A | 3/1974 |
| JP | 49-80685 A | 8/1974 |

(Continued)

*Primary Examiner* — Daniel Howell
*Assistant Examiner* — Ryan Rufo
(74) *Attorney, Agent, or Firm* — Richard M. Goldberg

(57) ABSTRACT

A cutting method in which, in cutting a circumferential face of a work, control is enabled to make a cutting velocity constant accurately by using a cutting tool projecting from a main shaft which turns around a predetermined position serving as a center and for which a turning radius is adjustable, wherein, in the case that a turning angular velocity of the main shaft is represented as ω, a distance from a turning center to a tip of the cutting tool is represented as R, and a cutting velocity of the tip of the cutting tool is set to a constant value C, making the cutting velocity of the cutting tool constant by performing control such that ω0 changes in association with a change in the distance R so that $$\omega = (C^2 - \dot{R}^2)^{1/2}/R$$

is formulated (where $\dot{R}$ denotes a time differential of the distance R), thus providing an even cut face.

9 Claims, 4 Drawing Sheets

(51) Int. Cl.
*B23B 5/38* (2006.01)
*B23B 5/40* (2006.01)

(56) References Cited

U.S. PATENT DOCUMENTS

| | | | |
|---|---|---|---|
| 4,676,704 A | 6/1987 | Donnini et al. | |
| 5,713,253 A * | 2/1998 | Date | G05B 19/184 409/131 |
| 6,367,359 B1 | 4/2002 | Ropos | |
| 7,861,624 B2 * | 1/2011 | Kunimatsu | B23B 1/00 82/1.11 |
| 2002/0053264 A1 * | 5/2002 | Kikuchi | B23Q 1/621 82/1.4 |
| 2003/0010531 A1 * | 1/2003 | Hamamura | B23B 35/00 175/24 |
| 2006/0219066 A1 * | 10/2006 | Nicholl | B23B 41/04 82/1.11 |
| 2007/0292227 A1 * | 12/2007 | Giovanelli | B23Q 15/14 409/132 |
| 2012/0096999 A1 * | 4/2012 | Hyatt | G05B 19/40938 82/1.11 |
| 2013/0156523 A1 * | 6/2013 | Yamaguchi | B23C 3/32 409/132 |

FOREIGN PATENT DOCUMENTS

| | | |
|---|---|---|
| JP | 57-132905 A | 8/1982 |
| JP | 8-126938 A | 5/1996 |
| JP | 9-201741 A | 8/1997 |
| JP | 2000-190126 A | 7/2000 |
| JP | 2000-190127 A | 7/2000 |
| JP | 2000-205155 A | 7/2000 |
| JP | 2001-113443 A | 4/2001 |
| JP | 2006-326786 A | 12/2006 |
| JP | 2011-131324 A | 7/2011 |
| JP | 10-277820 A | 1/2013 |
| JP | 2013-503380 A | 1/2013 |

\* cited by examiner

CUTTING METHOD FOR INNER CIRCUMFERENTIAL FACE OR OUTER CIRCUMFERENTIAL FACE OF WORK

REFERENCE TO RELATED APPLICATION

The present application is a continuation-In-Part of U.S. patent application Ser. No. 15/069,156 filed Mar. 14, 2016.

BACKGROUND OF THE INVENTION

The present invention relates to a cutting method for an inner circumferential face and an outer circumferential face of a work using a cutting tool of a main shaft which turns around a predetermined position serving as a center and for which a turning radius is adjustable, the cutting being performed by making a cutting velocity of the cutting tool constant.

The "turning of the main shaft" is not limited to rotation of the main shaft along a central axis thereof but refers to rotations including revolution of the main shaft around the predetermined position serving as a center.

What is called an orbit machining that a main shaft turns around a predetermined center has been adopted as a method for forming an inner circumferential face and an outer circumferential face of a work into curved faces variously shaped like cylinders, tapered shapes, flanges, or the like, as disclosed in Patent Literature 1. This machining method is technically advantageous in that machining can be achieved at whatever position a table supporting the work is located.

A cutting velocity needs to be constant in order to provide an even cut face.

However, for the orbit machining method according to the related art as is described above, no configuration that makes a cutting velocity constant has been adopted.

Patent Literature 2 discloses a configuration, for cutting method of gear shaped object, needed to maintain a constant cutting velocity from a cutting start point to a cutting end point.

However, Patent Literature 2 only discloses that the cutting velocity is made constant simply under the control of an NC lathe and fails to clarify what qualitative or quantitative criteria are used to make a cutting velocity constant.

Patent Literature 3 discloses that a CAM controls the number of rotations of the main shaft to obtain a constant cutting velocity. However, Patent Literature 3 also fails to clarify a specific configuration concerning what criteria are used to make a cutting velocity constant.

Furthermore, Patent Literatures 2 and 3 are predicted on cutting based on rotation of the main shaft along a central shaft thereof and do not disclose or suggest that the cutting velocity is constant when the main shaft turns around a predetermined position serving as a center as is the case with the present invention.

Thus, for the cutting of the inner circumferential face or the outer circumferential face of the work based on turning of the main shaft, no cutting method has been proposed in which the cutting velocity of the cutting tool is controlled to be constant.

Patent literature 4 discloses that a cutting velocity of a cutting tool is set to be constant by changing $\omega$ according to a change of a distance R wherein $\omega$ is rotational angular velocity of a main shaft, R is the distance from a rotational center to a tip of the cutting tool, and constant value C is set as the cutting velocity in the tip of the cutting tool (paragraph [0040] and FIG. 7 (a) and (b)).

However, constant cutting velocity in patent literature 4 means that a value of R–$\omega$ is constant at most, and patent literature 4 does not disclose obtaining constant velocity with a factor of a time differential of the distance R.

So, patent literature 4 does not disclose the state of setting the cutting velocity accurately.

RELATED ART LITERATURE

Patent Literature

Patent Literature 1: JP H08-126938 A
Patent Literature 2: JP 2000-190127 A
Patent Literature 3: JP 2001-113443 A
Patent Literature 4: JP 2011-131324 A

BRIEF SUMMARY OF THE INVENTION

According to the present invention, there is provided a cutting method in which, in cutting an inner circumferential face or an outer circumferential face of a work based on turning of a main shaft around a predetermined position serving as a center, control is enabled to make a cutting velocity constant accurately.

According to the present invention, there are further provided a basic configuration (1); a cutting method for an inner circumferential face or an outer circumferential face of a work using a cutting tool projecting from a main shaft which turns around a predetermined position serving as a center and for which a turning radius is adjustable, wherein, in the case that a turning angular velocity of the main shaft is represented as $\omega$, a distance from a turning center to a tip of the cutting tool is represented as R, and a cutting velocity of the tip of the cutting tool is set to a constant value C, the cutting velocity of the cutting tool is made constant by performing control such that $\omega$ changes in association with a change in the distance R and $\dot{R}$ denotes a time differential of the distance R so that $$\omega = (C^2 - \dot{R}^2)^{1/2}/R$$

is formulated (where $\dot{R}$ denotes a time differential of the distance R), and a basic configuration (2) the cutting method for an inner circumferential face or an outer circumferential face of the work of the basic configuration (1), wherein the work is put on a table, and a position of the turning center of the main shaft is movable in one of:

an orthogonal direction to a plane orthogonal to a turning central axis of the main shaft and an oblique direction which is an intermediate direction between a direction of the plane and an orthogonal direction to the plane, and when the position of the turning center of the main shaft is movable in the oblique direction, setting a supporting position of the work on the table on which the work is placed, so that a distance from a cutting position of the work to the turning center of the cutting tool is R by moving the table along a direction of the plane by a distance along a component of the direction of the plane in association with the movement in the oblique direction to maintain a state where cutting is enabled, and a basic configuration (3) the cutting method for an inner circumferential face or an outer circumferential face of the work of the basic configuration (1), wherein the work is put on a rotational table, and the table is put on a pedestal of a machining center which can not only cut the work but also manufacture the work besides cutting, and a position of the turning center of the main shaft is movable in one of:

an orthogonal direction and an oblique direction to a plane orthogonal to the turning central axis, and when the position of the turning center of the main shaft is movable in the oblique direction, setting a supporting position of the work on the table on which the work is placed, such as that a distance from the cutting position of the work to the turning center of the cutting tool is R by moving the pedestal of the machining center along a direction of the plane in association with the movement in the oblique direction to maintain a state where cutting is enabled, and a basic configuration (4) the cutting method for an inner circumferential face or an outer circumferential face of the work of the basic configuration (1), wherein the work is held by an arm of a robot, and a position of the turning center of the main shaft is movable in one of:

an orthogonal direction to a plane orthogonal to a turning central axis of the main shaft and an oblique direction which is an intermediate direction between a direction of the plane and an orthogonal direction to the plane, and when the position of the turning center of the main shaft is movable in the oblique direction, setting a holding position of the work by the arm of the robot, so that a distance from a cutting position of the work to the turning center of the cutting tool is R by moving the arm of the robot along a direction of the plane by a distance along a component of the direction of the plane in association with the movement in the oblique direction to maintain a state where cutting is enabled.

In the aspect of the present invention, the basic configuration (1) makes a cutting velocity constant to provide an even cut face, while the basic configurations (2), (3) and (4) enables the inner circumferential face or the outer circumferential face of the work to be formed into any of various curved faces.

That is, the aspect of the present invention eliminates the need for control based on complicated calculations or operations as disclosed in Patent Literature 2 and 3.

BRIEF DESCRIPTION OF THE DRAWINGS

FIG. 1 (a), (b) are block diagrams of a system allowing a method of the present invention to be implemented, FIG. 1 (a) denoting an embodiment that a work is put on a table, and FIG. 1 (b) denoting an embodiment that a work is put on a rotational table, and the rotational table is put on a pedestal of a machining center.

DETAILED DESCRIPTION OF THE INVENTION

Figure 1:
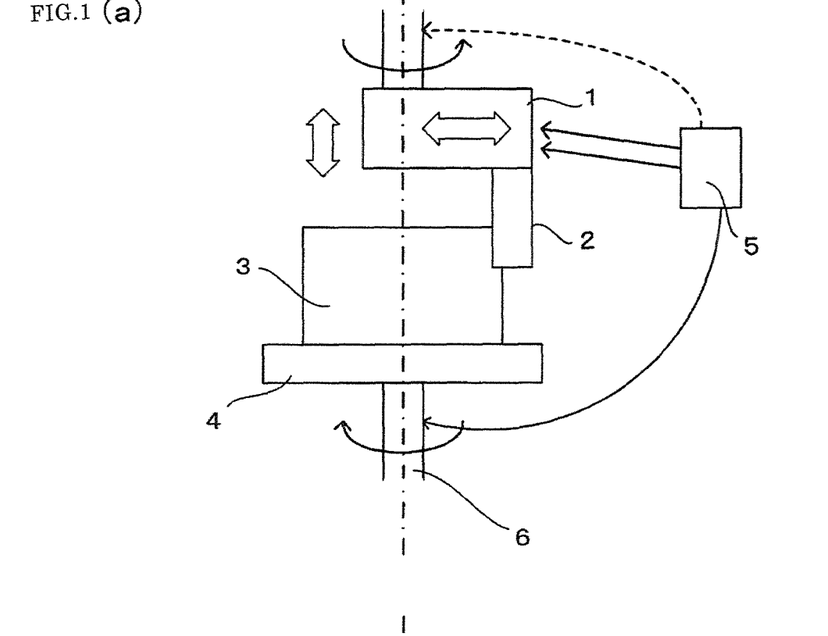

As is denoted in FIG. 1 (a), (b), components of the present invention include a main shaft 1 that turns, a cutting tool 2 provided at a tip side of the main shaft 1, a work 3, a table 4 that supports the work 3 (denoted in FIG. 1 (a)), or a table 4 that supports the work 3 and the pedestal 41 of machining center on which the table 4 is put (denoted in FIG. 1 (b)), or an arm of a robot for holding the work 3 (not denoted in Figures), and a control apparatus 5 that controls movement of the main shaft 1 and the table 4 or the pedestal 41, or the arm of the robot.

In FIG. 1, blank arrows indicate a moving state of the main shaft 1 associated with adjustment of a turning radius or a moving state of the main shaft 1 in the orthogonal direction or the oblique direction, curved arrows indicate a turning state by revolution of the main shaft 1 and a rotating state of the table 4, a dotted arrow from the control apparatus 5 indicates a state where signals which allow a turning angular velocity and a rotating angular velocity to be controlled are dispatched, and solid arrows indicate states where signals are dispatched which allow control of movement of the main shaft 1 associated with adjustment of the turning radius of the main shaft 1, and in the basic configurations (2), (3) and (4), control of movement of the rotating center of the table 4, or the pedestal 41, or the arm of the robot associated with movement of the turning center of the main shaft 1 in the orthogonal direction or the oblique direction which is intermediate a direction between the direction of the plane and the orthogonal direction and movement of the turning center of the main shaft 1 in the oblique direction.

In the present invention, elements to be controlled are parameters indicative of the turning angular velocity of the main shaft 1 with respect to the turning center, and the turning radius of the main shaft 1 (these elements correspond to the basic configuration (1)), and further the moving position and the moving velocity of the turning center in the orthogonal direction or the oblique direction which is intermediate a direction between the direction of the plane and the orthogonal direction with respect to a plane orthogonal to a central axis 6 for turning of the main shaft 1 (these elements correspond to the basic configurations (2), (3) and (4). For the basic configuration (1), the number of the parameters is two, and for the basic configurations 2), (3) and (4), the number of the parameters is three.

The main shaft 1 and the cutting tool 2 make turning motion around a predetermined central position. A tip of the cutting tool 2 cuts an inner circumferential face of the work 3 as is denoted in FIG. 2(a) or cuts an outer circumferential face of the work 3 as is denoted in FIG. 2(b). The turning radius of the main shaft 1 from the central position is adjustable, and thus, the radius of curvature of the tip of the cutting tool 2 is also adjustable, allowing a cutting curved face to be optionally selected.

Figure 2:
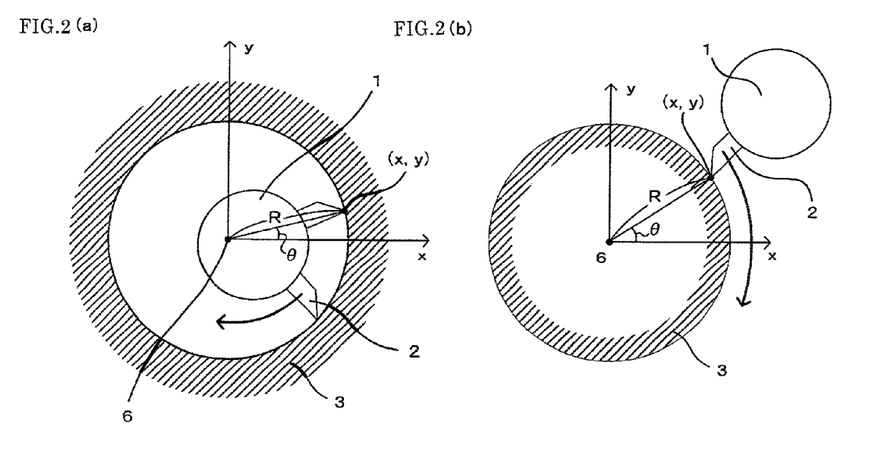
FIGS. 2(a) and 2(b) are plan views denoting the state of a plane in a direction orthogonal to a turning central axis of a main shaft, FIG. 2(a) denoting that an inner circumferential face is cut, and FIG. 2(b) denoting that an outer circumferential face is cut.

That is, circumferential curved faces in FIGS. 2(a) and 2(b) merely denote typical examples based on rotation by the composition of the revolution of the main shaft 1 and the rotation of the table 4. The cutting curved face is not necessarily limited to the circumferential curved face.

Criteria based on expressions for the basic configuration (1) and corresponding to a technical demand for provision of an even cut face will be described below.

As is denoted in FIGS. 2(a) and 2(b), if the distance from the turning center to the tip of the cutting tool 2 is represented as R, and an angular position of the cutting tool 2 is represented as θ, and that a coordinate position of the cutting tool 2 is represented as (X, Y), then X = R cos θ and Y = R sin θ is formulated and $$\dot{X}=\dot{R}\cos\theta-R\dot{\theta}\sin\theta, \dot{Y}=\dot{R}\sin\theta+R\dot{\theta}\cos\theta$$

is formulated (dots over reference characters indicate time differentials).

Therefore, when the cutting velocity is represented as V, $$V^2=\dot{X}^2+\dot{Y}^2=\dot{R}^2+R^2\dot{\theta}^2$$

is formulated.

According to the above-described relational expressions, wherein, in the case that the turning angular velocity of the main shaft 1 is represented as $\omega_1$ and the rotating angular velocity of the table 4 is represented as $\omega_2$, the constant value C may be preset and controlled to formulate $$\omega=\dot{\theta}=(C^2-\dot{R}^2)^{1/2}/R$$

in association with the distance R and $\dot{R}$ that is a time differential of the distance R, in order to allow the tip of the cutting tool 2 to operate at a constant cutting velocity V.

In the present invention, to form each of the inner and outer circumferential faces into any of various cutting shapes, the following embodiment may be adopted. That is, as shown in the basic configuration (2) as is denoted in FIG. 1(a), wherein the work 3 is put on a table 4, and a position of the turning center of the main shaft 1 is movable in one of:

an orthogonal direction to a plane orthogonal to the turning central axis of the main shaft and an oblique direction which is intermediate a direction between the direction of the plane and the orthogonal direction to the plane, when the position of the turning center of the main shaft 1 is movable in the oblique direction, setting a supporting position of the work 3 on the table 4 on which the work 3 is placed, such as that a distance from the cutting position of the work 3 to the turning center of the cutting tool 2 is R by moving the table 4 along a direction of the plane by a distance along a component of the direction of the plane in association with the movement in the oblique direction to maintain a state where cutting is enabled (wherein, FIG. 1(a) denotes the case of the turning center of the main shaft 1 moving along the orthogonal direction), or as shown in the basic configuration (3) denoted in FIG. 1(b), wherein the work 3 is put on a rotational table 4, and the table 4 is put on a pedestal 41 of a machining center which can not only cut the work 3 but also manufacture the work 3 besides cutting, and a position of the turning center of the main shaft 1 is movable in one of:

an orthogonal direction and
an oblique direction to a plane orthogonal to the turning central axis 6, and when the position of the turning center of the main shaft 1 is movable in the oblique direction, setting a supporting position of the work 3 on the table 4 on which the work 3 is placed, such as that a distance from the cutting position of the work 3 to the turning center of the cutting tool 2 is R by moving the pedestal 41 of the machining center along a direction of the plane in association with the movement in the oblique direction to maintain a state where cutting is enabled, or wherein the work 3 is held by an arm of a robot (not denoted in figures), and a position of the turning center of the main shaft 1 is movable in one of:

an orthogonal direction to a plane orthogonal to the turning central axis of the main shaft and an oblique direction which is intermediate a direction between the direction of the plane and the orthogonal direction to the plane, and when the position of the turning center of the main shaft 1 is movable in the oblique direction, setting a holding position of the work 3 by the arm of the robot, such as that a distance from the cutting position of the work 3 to the turning center of the cutting tool 2 is R by moving the arm of the robot along a direction of the plane by a distance along a component of the direction of the plane in association with the movement in the oblique direction to maintain a state where cutting is enabled.

In a basic configuration (2), it is not necessary to rotate a table 4.

However, in a basic configuration (3), it is necessary that a table 4 is rotational in the case of manufacturing part 40 acting the work 3 besides cutting.

So, in the case of a basic configurations (2), (3) and (4), when the turning center of the main shaft 1 is movable in the oblique direction, the turning central axis 6 of the main shaft 1 moves by itself, and the position of the table 4 or the pedestal 41 along the direction of the plane (in the case of a basic configurations (2) or (3)), or the position of the arm of the robot along the direction of the plane (in the case of a basic configuration (4) should be moved with a synchronized state to the position of the turning center in order to maintain a state where the cutting tool 2 can cut the work 3.

Figure 3:
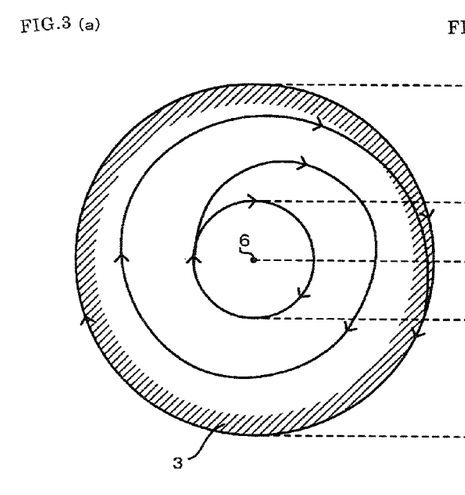
FIGS. 3(a) and 3(b) denote a method of forming a normal tapered shape by moving the position of a turning center of the main shaft and sequentially changing a turning radius, FIG. 3(a) being a plan view denoting a locus of movement of a tip of a cutting tool, and FIG. 3(b) being a side view of the tapered shape formed by the sequential change.

FIGS. 3(a) and 3(b) denote that the outer circumferential face is formed into a normal tapered shape in accordance with the embodiment in which the position of the turning center of the main shaft 1 is moved in the orthogonal direction, while the turning radius is sequentially changed.

When the tapered shape has circumferential curved faces at opposite ends thereof, the turning radius may be approximately constant at an initial stage and a final stage of turning as is denoted in FIGS. 3(a) and 3(b).

Figure 4:
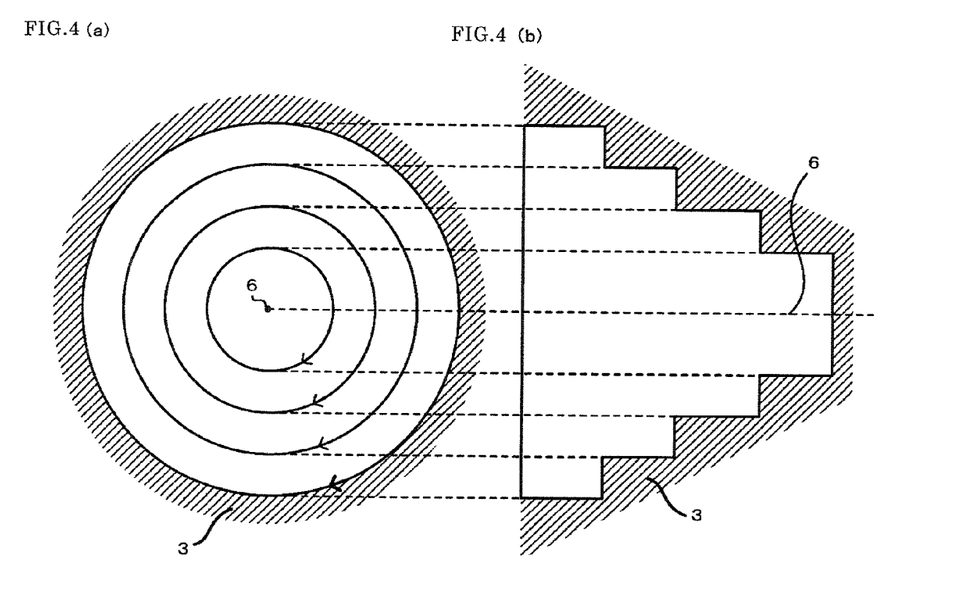
FIGS. 4(a) and 4(b) denote a method of forming a stepped tapered shape by moving the position of the turning center of the main shaft and changing the turning radius in a stepwise manner, FIG. 4(a) being a plan view denoting a locus of movement of the tip of the cutting tool, and FIG. 4(b) being a side view of the stepped tapered shape formed by the stepwise change.

FIGS. 4(a) and 4(b) denote that the inner circumferential face is formed into a stepped tapered shape in accordance with the embodiment in which the position of the turning center of the main shaft 1 is moved in the orthogonal direction, while the turning radius is changed in a stepwise manner.

As is apparent from FIGS. 3(a) and 3(b) and FIGS. 4(a) and 4(b), the basic configuration (2) enables the inner circumferential face or the outer circumferential face to be formed into any of various shapes.

The above-described drawings all denote that the turning center of the main shaft 1 is moved in the direction orthogonal to the plane orthogonal to the turning central axis 6, that is, in the same direction as that of the turning central axis 6. When the turning center is moved in the direction oblique to the plane which is intermediate a direction between the direction of the plane and the orthogonal direction, a tapered shape is obtained which generally changes in the oblique direction.

Alternatively to the embodiments denoted in FIGS. 3(a) and 3(b) and FIGS. 4(a) and 4(b), if the turning radius of the main shaft 1 is not changed, the inner circumferential face or the outer circumferential face (not denoted in the drawings) can be formed into a normal cylindrical shape (when the turning center moves in the orthogonal direction) or an oblique cylindrical shape (when the turning center moves in the oblique direction).

Figure 5:
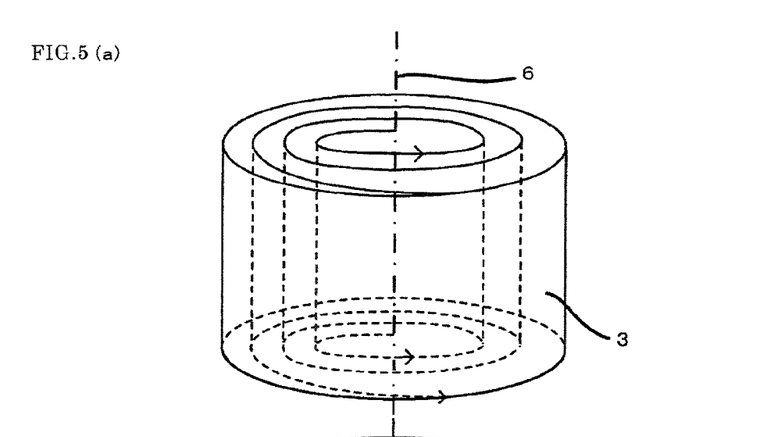
FIGS. 5(a), 5(b), and 5(c) are perspective views denoting a process of forming a ring shape by helically moving and finally circumferentially moving the tip of the cutting tool in an inner region and an outer region of the work without moving the turning center position of the main shaft, FIG. 5(a) denoting a process of forming an inner wall in a ring shape, FIG. 5(b) denoting a process of forming an outer wall in a ring shape, and FIG. 5(c) denoting the finished ring shape.

FIG. 5 denotes an embodiment in which the position of the turning center of the main shaft 1 is not moved in the orthogonal direction nor the oblique direction. In the embodiment, a ring shape is formed as follows.

(1) In an inner region of the work 3 that is close to the turning center, the distance from the turning center to the tip of the cutting tool 2 is sequentially increased to move the tip along a helical locus, in the case that the distance reaches a maximum state, the maximum state is maintained to form an inner wall in a ring shape.

(2) In an outer region of the work 3 that is away from the turning center, the distance from the turning center to the tip of the cutting tool 2 is sequentially reduced to move the tip along a helical locus, in the case that the distance reaches a minimum state, the minimum state is maintained to form an outer wall in a ring shape.

In the above-described embodiment, the ring shape can be quickly obtained.

Thus, in the present invention, the work 3 is cut with a summation of the cutting velocity to allow the inner circumferential face and the outer circumferential face to be quickly formed. The need for special control for the summation is not required to achieve simple control.

EXAMPLE

In an example, a plurality of main shafts 1 and cutting tools 2 projecting from the respective main shafts 1 are adopted.

In this example, the plurality of cutting tools 2 performs cutting to further increase the cutting velocity, while the properties of the individual cutting tools 2 related to the cut face are averaged to allow a more even cut face to be provided.

As is described above, the present invention enables the inner circumferential face and the outer circumferential face of the work to be cut into any of various shapes with even cut faces at a constant cutting velocity. Thus, the present invention has enormous applicability.

Explanation of Signature

1 a main shaft
2 a cutting tool
3 a work
4 a table
40 a manufacturing part of a machining center for manufacturing the work besides cutting
41 a pedestal in the machining center
5 a control apparatus
6 a central axis of turning or rotation

What is claimed is:

1. A cutting method for an inner circumferential face or an outer circumferential face of a work using a cutting tool projecting from a main shaft which turns around a predetermined position serving as a center and for which a turning radius is adjustable, comprising the steps of:
in the case that a turning angular velocity of the main shaft is represented as $\omega$, a distance from a turning center to a tip of the cutting tool is represented as R, and a cutting velocity of the tip of the cutting tool is set to a constant value C, making the cutting velocity of the cutting tool constant by performing control such that $\omega$ changes in association with a change in the distance R and $\dot{R}$ denotes a time differential of the distance R so that $$\omega = (C^2 - \dot{R}^2)^{1/2}/R$$

is denoted.

2. The cutting method for an inner circumferential face or an outer circumferential face of a work according to claim 1, wherein the work is put on a table, and a position of the turning center of the main shaft is movable in one of:
an orthogonal direction to a plane orthogonal to a turning central axis of the main shaft and
an oblique direction which is an intermediate direction between a direction of the plane and an orthogonal direction to the plane, and
when the position of the turning center of the main shaft is movable in the oblique direction, setting a supporting position of the work on the table on which the work is placed, so that a distance from a cutting position of the work to the turning center of the cutting tool is R by moving the table along a direction of the plane by a distance along a component of the direction of the plane in association with the movement in the oblique direction to maintain a state where cutting is enabled.

3. The cutting method for an inner circumferential face or an outer circumferential face of a work according to claim 1,
wherein the work is held by an arm of a robot, and a position of the turning center of the main shaft is movable in one of:
an orthogonal direction to a plane orthogonal to a turning central axis of the main shaft and
an oblique direction which is an intermediate direction between a direction of the plane and an orthogonal direction to the plane, and when the position of the turning center of the main shaft is movable in the oblique direction, setting a holding position of the work by the arm of the robot, so that a distance from a cutting position of the work to the turning center of the cutting tool is R by moving the arm of the robot along a direction of the plane by a distance along a component of the direction of the plane in association with the movement in the oblique direction to maintain a state where cutting is enabled.

4. The cutting method for an inner circumferential face or an outer circumferential face of a work according to claim 2, further comprising the step of moving the position of the turning center of the main shaft in one of the orthogonal direction and the oblique direction, while the distance R is sequentially changed.

5. The cutting method for an inner circumferential face or an outer circumferential face of a work according to claim 2, further comprising the step of moving the position of the turning center of the main shaft in one of the orthogonal direction and the oblique direction, while the distance R is changed in a stepwise manner.

6. The cutting method for an inner circumferential face or an outer circumferential face of a work according to claim 1, wherein a position of the turning center of the main shaft is unmoved in the orthogonal direction nor the oblique direction, and further comprising the step of forming a ring shape by the following steps:
(1) in an inner region of the work that is close to the turning center, sequentially increasing the distance from the turning center to the tip of the cutting tool to move the tip along a helical locus, in the case that the distance reaches a maximum state, so that the maximum state is maintained to form an inner wall in a ring shape, and (2) in an outer region of the work that is away from the turning center, sequentially reducing the distance from the turning center to the tip of the cutting tool to move the tip along a helical locus, in the case that the distance reaches a minimum state, so that the minimum state is maintained to form an outer wall in a ring shape.

7. The cutting method for an inner circumferential face or an outer circumferential face of a work according to claim 1, further comprising the step of adopting a plurality of main shafts and cutting tools projecting from the respective main shafts.

8. The cutting method for an inner circumferential face or an outer circumferential face of a work according to claim 3, further comprising the step of moving the position of the turning center of the main shaft in one of the orthogonal direction and the oblique direction, while the distance R is sequentially changed.

9. The cutting method for an inner circumferential face or an outer circumferential face of a work according to claim 3, further comprising the step of moving the position of the turning center of the main shaft in one of the orthogonal direction and the oblique direction, while the distance R is changed in a stepwise manner.

\* \* \* \* \*